United States Patent
Sehlin et al.

(10) Patent No.: US 6,783,646 B2
(45) Date of Patent: Aug. 31, 2004

(54) MODULAR CERAMIC OXYGEN SYSTEM

(75) Inventors: Scott R. Sehlin, Bettendorf, IA (US); Timothy C. Phillis, Rock Island, IL (US)

(73) Assignee: Carleton Life Support Systems, Inc., Orchard Park, NY (US)

( * ) Notice: Subject to any disclaimer, the term of this patent is extended or adjusted under 35 U.S.C. 154(b) by 65 days.

(21) Appl. No.: 10/604,117

(22) Filed: Jun. 26, 2003

(65) Prior Publication Data

US 2004/0042944 A1 Mar. 4, 2004

Related U.S. Application Data

(60) Provisional application No. 60/319,507, filed on Aug. 28, 2002.

(51) Int. Cl.[7] .................................................. C25B 9/00
(52) U.S. Cl. .............................. 204/279; 429/31; 429/32
(58) Field of Search ........................... 204/279; 429/31, 429/32

(56) References Cited

U.S. PATENT DOCUMENTS

| | | | | |
|---|---|---|---|---|
| 4,364,798 A | * | 12/1982 | Costa ........................ 202/267.1 |
| 4,416,732 A | * | 11/1983 | Gernhardt et al. .......... 202/139 |
| 4,431,484 A | * | 2/1984 | Weber et al. ............... 202/141 |
| 4,898,792 A | * | 2/1990 | Singh et al. ................ 429/19 |
| 5,378,345 A | | 1/1995 | Taylor et al. ............... 204/421 |
| 5,498,487 A | * | 3/1996 | Ruka et al. ................. 429/20 |
| 5,855,762 A | | 1/1999 | Phillips et al. ............. 205/634 |
| 5,871,624 A | | 2/1999 | Crome ........................ 204/286.1 |
| 5,972,182 A | | 10/1999 | Lawless ..................... 204/258 |
| 5,985,113 A | | 11/1999 | Crome et al. ............... 205/343 |
| 6,194,335 B1 | | 2/2001 | Crome et al. ............... 501/103 |
| 6,203,676 B1 | | 3/2001 | Phillips et al. ............. 204/256 |
| 6,290,757 B1 | | 9/2001 | Lawless ..................... 96/19 |
| 6,291,089 B1 | * | 9/2001 | Piascik et al. ............. 429/17 |
| 6,352,624 B1 | | 3/2002 | Crome et al. ............... 204/277 |
| 6,379,831 B1 | * | 4/2002 | Draper et al. .............. 429/31 |
| 6,382,958 B1 | | 5/2002 | Bool, III et al. ............ 431/2 |

* cited by examiner

*Primary Examiner*—Bruce F. Bell
(74) *Attorney, Agent, or Firm*—Marsteller & Associates, P.C.

(57) ABSTRACT

An oven insert (110) for a gas generating system of the type that includes heating elements, heat exchanger, a gas generating module (22), an air inlet, and a product gas outlet, includes a furnace enclosure member formed with a plurality of interior chambers. The interior chambers (112) are adapted for holding at least one gas generating module (22). The interior chambers (112) each have an opening (122) formed an exterior face (124) of the furnace enclosure member (110). The openings are spaced along a central axis (126) of the face (124) of the furnace enclosure member (110).

8 Claims, 4 Drawing Sheets

MODULAR CERAMIC OXYGEN SYSTEM

CROSS REFERENCE TO RELATED APPLICATIONS

This application claims the benefit of U.S. Provisional Application Serial No. 60/319,507, filed Aug. 28, 2002, entitled MODULAR CERAMIC OXYGEN SYSTEM.

BACKGROUND OF INVENTION

1. Technical Field

The invention relates to the field of gas separation devices. More specifically, devices that use an electrochemical process to separate one gas (oxygen for example) from a mixture of gasses (air for example).

2. Background Art

In one embodiment of a gas generating system, a solid-state process is used to separate oxygen from atmospheric air for medical use. Such a device is called a ceramic oxygen generating system or COGS. The ceramic electrolyte used in the oxygen separation process must be maintained at a temperature of approximately 600Â° C. or higher for the ionic transport mechanism to operate efficiently. In addition, a fairly uniform temperature distribution with the separation furnace is essential to proper and efficient system operation.

A significant problem arises when the product flow rate from the system is turned down. For any given operating temperature, the heat dissipated by the separation modules is roughly proportional to the square of the product flow rate while conductive heat losses through the furnace walls are essentially constant. An efficiently designed system is thermally balanced such that the heat dissipated by the modules is just slightly less than what is required to maintain the desired furnace temperature.

As product flow rate is reduced, the heat input to the system by way of the separation modules decreases very rapidly. Since the heat loss through the furnace wall remains unchanged, supplemental heat (supplied by of auxiliary heaters) will be needed in order to maintain the furnace at the desired operating temperature. This auxiliary heat input has no functional value, save for maintaining temperature, and a significant fraction of it bercomes an unrecoverable loss due to conduction through the furnace walls and other losses. Stated simply, a single furnace enclosure properly sized for one product flow rate can have an excessive, overhead, heat loss when that flow rate is reduced.

In addition, in a larger furnace as the input power to the modules is decreased and the input power to the auxiliary heaters is increased, temperature uniformity in furnace may be adversely affected. This is due, in part, to the very different surface characteristics and geometric shape factors between the separation modules and the auxiliary heaters. Reduced performance and possibly reduced system life may result from this lack of temperature uniformity.

While the above cited references introduce and disclose a number of noteworthy advances and technological improvements within the art, none completely fulfills the specific objectives achieved by this invention.

SUMMARY OF INVENTION

In accordance with the present invention, an oven insert for a gas generating system of the type that includes heating elements, heat exchanger, a gas generating module, an air inlet, and a product gas outlet, comprises a furnace enclosure member formed with a plurality of interior chambers. The interior chambers are adapted for holding at least one gas generating module. The interior chambers each have an opening formed an exterior face of the furnace enclosure member. The openings are uniformly separated along a central axis of the face of the furnace enclosure member.

The furnace enclosure member preferably includes embedded heater elements providing uniform heat distributed about the interior chambers.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

U.S. Pat. No. 5,985,113 issued on Nov. 16, 1999, U.S. Pat. No. 5,871,624 issued on Feb. 16, 1999 and U.S. Pat. No. 6,194,335 issued on Feb. 27, 2001, all of which are incorporated herein in their entirety and assigned to the instant assignee, teach how an electrochemical oxygen generating device can be manufactured that not only generates oxygen, but can be used to deliver the oxygen gas at pressures exceeding 2000 psig. It should be understood that terms such as "left" and "right" as used herein are to be construed in the relative sense and that the present invention is usable in any orientation.

Figure 1:
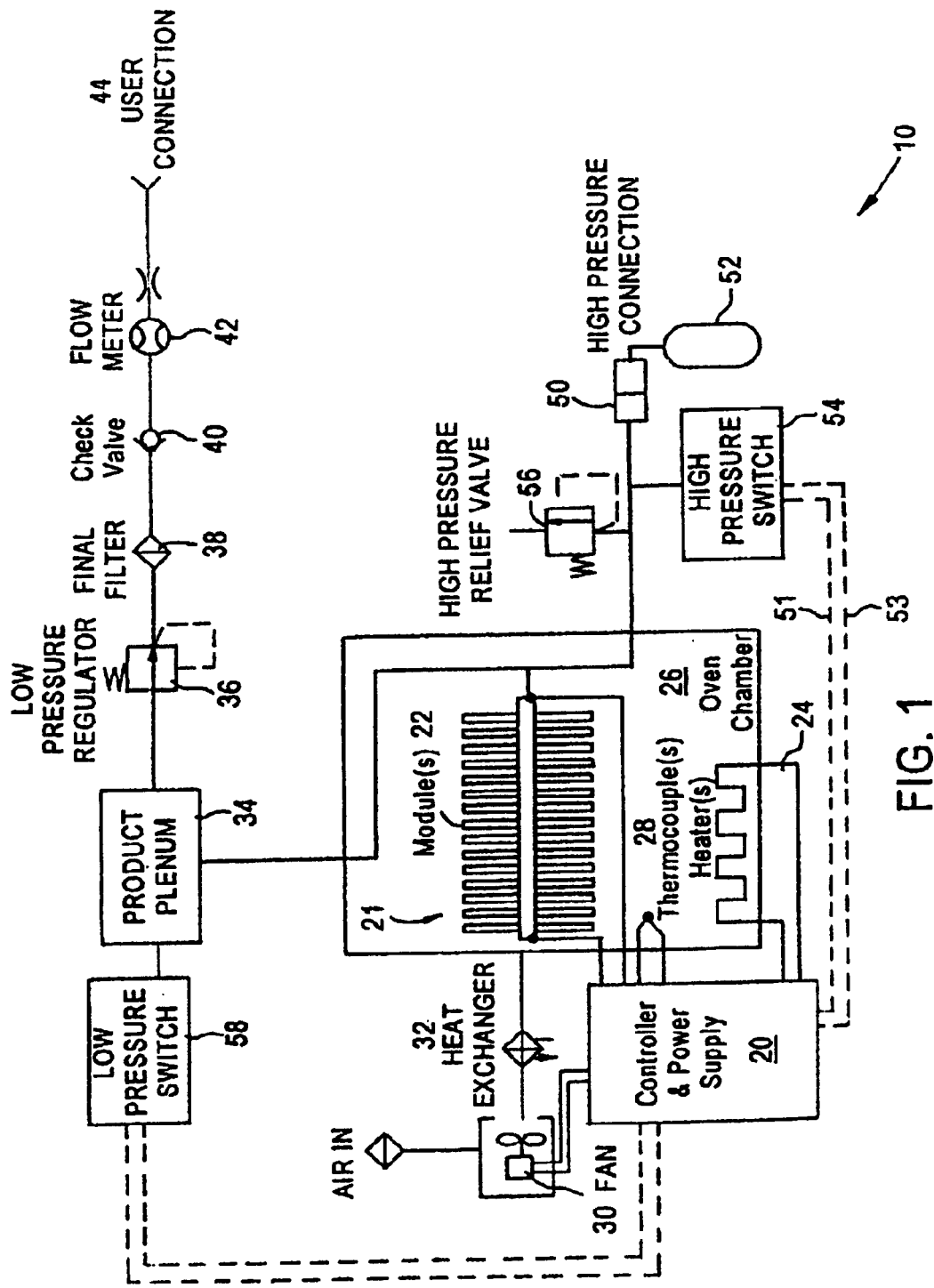
FIG. 1 depicts a schematic of a complete oxygen generating system 10 utilizing an electrochemical oxygen generator in the form of a modular ceramic oxygen generator.

FIG. 1 illustrates a schematic of a complete oxygen generating system 10 utilizing an electrochemical-oxygen generator in the form of a modular ceramic oxygen generator. This schematic depicts a power supply and controller 20 that supplies electrical power to an oven heater 24 to raise the temperature within the operating range of an oxygen-generating module assembly 22. The oxygen-generating module 22 assembly can include one or more oxygen-generating modules such as those disclosed in U.S. Pat. Nos. 5,871,624 and 5,985,113.

The temperature range in an oven chamber 26 may be about 500 to 800 degrees Celsius, depending on the materials used to construct the oxygen-generating module assembly 22. The oxygen-generating modules 22 are positioned in the oven chamber 26. After the oven chamber 26 reaches the minimum preferred operating temperature, as detected by at least one thermocouple 28 mounted in the oven chamber 26, the controller 20 begins to apply electrical power to a fan motor 30 to deliver oxygen-laden air through a counter-flow heat exchanger 32 into the oven 26 chamber to a module assembly 21 including at least one module 22. The controller 20 also delivers electrical power to the modules 22, and oxygen is electrochemically generated, as taught in U.S. Pat. Nos. 5,871,624 and 5,985,113. Depending upon the amount of oxygen to be generated, the amount of electrical power can be varied. As electrical power is delivered to the modules 22 and oxygen is generated, electrical resistance within the modules 22 generates additional heat. To compensate for this additional heat, the controller 20 reduces power to the oven heater 24, to maintain the desired nominal operating temperature in the oven chamber 26. The oxygen being generated is delivered to a product plenum 34, which acts as a temporary oxygen storage vessel. The oxygen is delivered from the product plenum 34 to a low-pressure regulator 36, final filter 38, check valve 40, flow meter 42, and lastly a user-adjustable valve 44 for immediate use, for example, by a patient.

Oxygen may also be delivered to a high-pressure connection that allows connection 50 of a removable portable oxygen storage cylinder 52. The portable cylinder 52 is filled automatically and can be used later. The controller 20 applies appropriate electrical power to the modules 22 to generate oxygen at elevated pressures until a high-pressure switch 54 detects a pressure over about 1800 psig. Upon exceeding 1800 psig, the controller 20 reduces power to the modules 22 until pressure at the high-pressure switch 54 falls below 1800 psig. The controller 20 also electrically monitors the low-pressure switch 58. This switch 54 enables regulation of the pressure delivered to the product plenum 34 and high-pressure connector 50 to a nominal pressure of about 1800 psig. A high-pressure relief valve 56 vents excess pressure above about 2000 psig, in the event of a malfunction of the controller 20 to limit the nominal pressure to less than 2000 psig, and to relieve excessive temperature-related pressure increases. It should be understood that the maximum normal operating pressure is approximately 1800 psig. The controller 20 also electrically monitors the high-pressure switch 54. If the operating pressure is below the minimum operating pressure after a given period of time, then the controller 20 activates a warning light and audible alarm (not shown).

Figure 2:
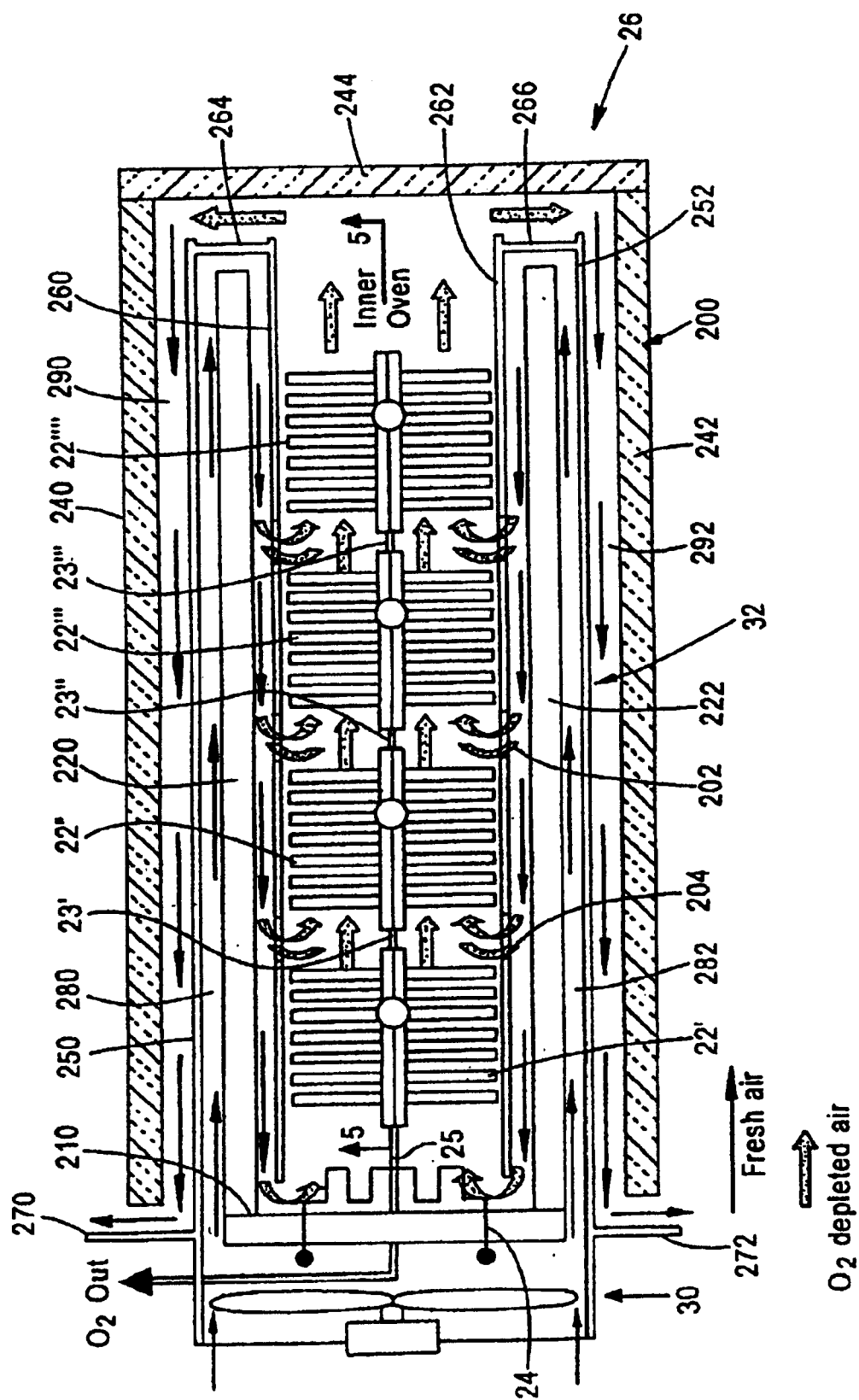
FIG. 2 is a schematic diagram depicting a cross section of the ceramic oxygen generating system depicting the oven, insulation, modules, heaters, planar counter flow heat exchanges, air flow dampers and fan.

FIG. 2 illustrates a cross-section of the ceramic oxygen generating system depicting the oven 26, insulation 200, oxygen-generating module assemblies 22, heaters 24, planar counter-flow heat exchangers 32, air-flow dampers 202, and fan 30. The counter-flow heat exchanger is a very effective, simple, low-cost design approach. As depicted in FIG. 2, four oxygen generating modules 22', 22", 22''', 22'''' from the oxygen-generating assembly 21 although any number of modules can be used. The oxygen-generating modules 22', 22", 22''', 22'''' are manifolded together by tubes 23', 23", 23'''. An outlet tube 25 passes through the wall 210 to provide high-pressure oxygen to the product plenum 34 and the high-pressure connection 50.

Cool fresh air is heated before the air enters the inner oven, and the hot air is cooled before it exits the oven 26; thereby, conserving energy. In a planar counter-flow configuration illustrated in FIG. 2, the fan 30 introduces cool, oxygen-laden air into the channels 280, 282 between the outer surface of the inner walls 220, 222 made of oven insulation 200 and the inner surfaces 250, 252 of the heat exchanger wall. This cool air is heated as it passes inward along the heat exchanger wall, because hot oxygen-depleted air is exiting outward from the inner oven 26 on the other side of the heat exchanger wall. The incoming air is also partially heated by an outer surface of the walls 220, 222 of oven insulation 200, followed by an inner surface of the walls 220, 222 of the oven insulation 200, after a 180° turn mid-way into the inner oven. Channels 280, 282 each flow from the fan 30 from left to right and then reverse and flow from right to left.

Electrical resistance is inherent to electrochemical oxygen generating systems that utilize electrical potential energy rather than chemical potential energy as a driving force. The electrochemical oxygen generating modules 22 generate heat as well as oxygen. Too much oven insulation 200 and very efficient heat exchangers could result in runaway oven temperatures. One method of temperature control is to ensure that some amount of heater activation is always used to maintain the normal operating temperature, after the initial startup period of time. Another method is to adjust the fan 30 speed to cause additional air to be circulated through the oven 26 carrying away the excess heat. The controller 20 monitors the temperature in the inner oven 26 using one or more strategically placed thermocouples 28 (not shown in FIG. 2) to ensure that the oven temperatures are normal. The controller 20 uses this information to adjust either the heater 24 voltage or fan 30 speed to control the temperature of the inner oven 26.

As depicted in FIG. 2, six air dampers 202 are used in the embodiment depicted in FIG. 2. Three dampers are each mounted to walls 260, 262 with the dampers 202 being positioned between modules 22 and opposite each other. The air dampers 202 shown allow some oxygen-laden air to enter the module chamber or inner oven 26 before completing the entire heat exchanger flow-path to the inner oven. If all oxygen-laden air were forced to traverse the entire heat exchanger flow-path, a higher temperature gradient would occur across the series of modules 22 in the oven. The air would be progressively heated as it passes over each module 22. Allowing some air to enter near the latter modules 22''', 22'''' provides a more uniform temperature across the modules 22' and prevents modules 22''', 22'''' from possibly over-heating. These dampers 202 are adjustable and can be manually adjusted during the assembly of the system 10 and during an initial start up test process after completion of the manufacturing and assembly process of the system 10. These dampers 202 include damper flaps 204 which are mounted to a suitable cylindrical rod (not shown) that extends through the inner oven insulation and support structure to outside the inner oven 26. The external ends of the damper rods can be rotated and secured in the preferred orientation during the assembly process. Alternately, the dampers could be adjusted automatically by the controller 20, based upon the inner oven 26 temperatures measured by the thermocouples 28. Several types of electromechanical damper actuators are available that could be used.

Modular Oven Chamber

Figure 3:
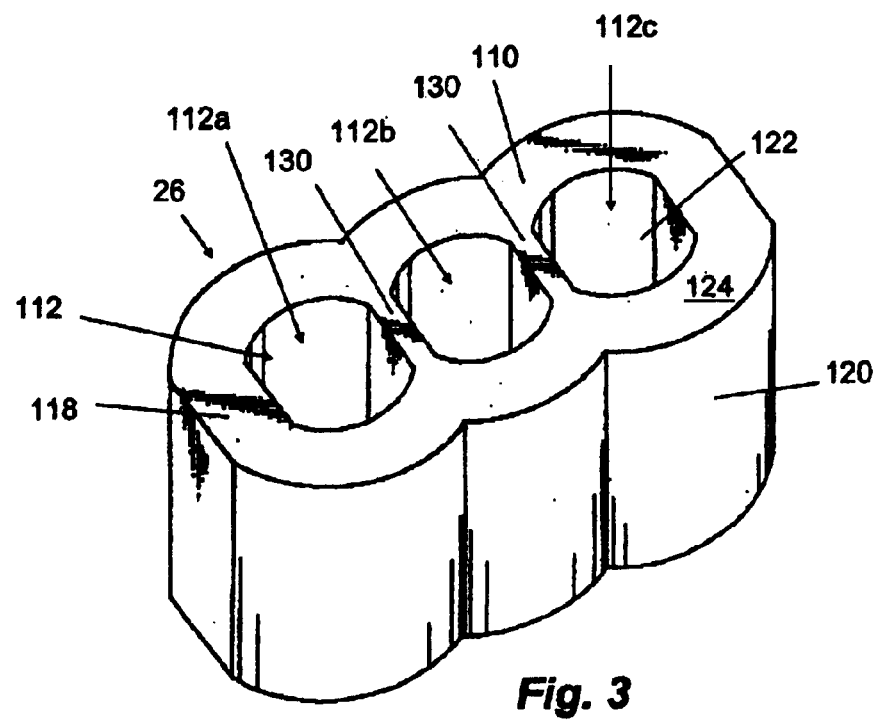
FIG. 3 is an isomeric view of an oven chamber module of the present invention.

The basic concept of the present invention is to improve overall system efficiency by employing several smaller separation furnaces instead of one large one. These smaller modular furnaces are thermally optimized (in terms of heat loss and temperature uniformity) to operate in a relatively narrow range product flow rates. As demand on the system increases, additional modules 22 are turned on to meet the increased demand for the product gas. When demand decreases, individual module assemblies 22 are either turned off or switched to a lower-temperature "standby" mode to conserve power. One embodiment of a modular furnace enclosure 110 is shown in FIG. 3. This furnace 110 has three separate heated chambers 112a, 112b, 112c that may be operated independently of each other.

Similar to the manner described with respect to FIG. 2, preferably a module assembly including at lest one module 22 is fitted within each chamber 112. Additionally, each of the oven chambers 112 should have at least one heater 114 and a controller 116 affecting the electrically connected and responsive heater 114. It is preferred that the heaters 114 are formed within or embedded within the interior of the chamber walls 118 such that each chamber 112 is effectively, uniformly heated by the corresponding heater 114.

The oven insert 110 for a gas generating system of the type that includes heating elements, heat exchanger, a gas generating module 22, an air inlet, and a product gas outlet, includes a furnace enclosure member 120 formed with a plurality of interior chambers 112. The interior chambers 112 are adapted for holding at least one gas generating module 22 and are separated one from another by an intermediary interstitial wall 130. The interior chambers 112 each have an opening 122 formed in exterior face 124 of the furnace enclosure member 110. The openings 122 are preferably uniformly separated along a central axis 126 of the exterior face 124 of the furnace enclosure member 110.

The gas generating components, such as the gas generating module 22, can be positioned within the oven insert 110 by being mounted in the selected chamber 112 through a respective opening 122.

One key feature to realizing the power saving potential of the present modular configuration is the completeness or adequacy of thermal isolation between furnace modules 112. The necessity of good thermal isolation between modules 112 has been suggested by analyses and borne out in laboratory tests.

Figure 4:
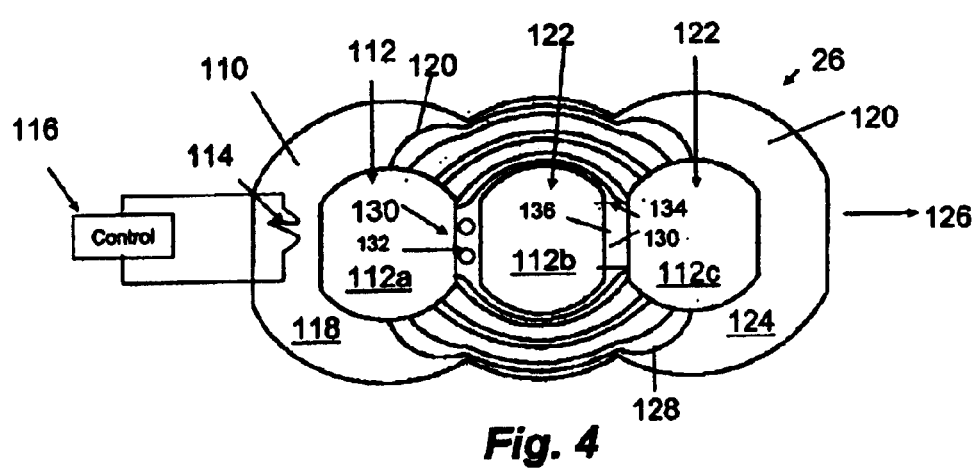
FIG. 4 is a top view of the oven chamber module of FIG. 3 with a depiction of equal gradient temperature lines.

FIG. 4 shows results of a 2D finite element thermal analysis of the furnace configuration previously shown in FIG. 3. In the depicted analysis in FIG. 4, only the center module 112b is operating. Equal temperature gradient distribution lines 128 are shown. The relatively thin interstitial center walls 130 between the center 112b and outside furnace modules 112a, 112c does not typically provide adequate thermal isolation. Consequently, a significant amount of heat may be lost into the non-operating modules. This problem is simply remedied by adding more insulation between the furnace modules 112 or between oven chamber modules or furnaces 110.

The walls 118 of the furnace module 110 are made from suitable thermally insulating material that is selected to maintain stability at the operating temperatures of the gas generator.

Figure 5:
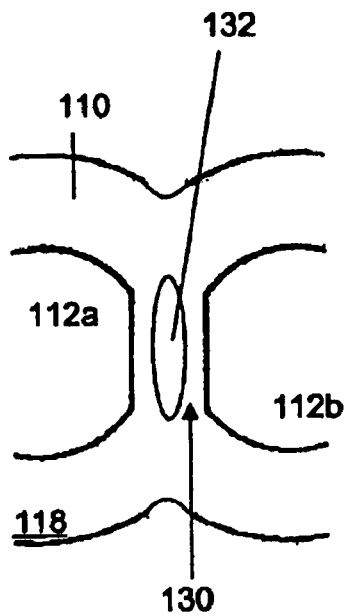
FIG. 5 is a top view of an alternative embodiment of the present invention having a chamber for thermal insulation formed in an interstitial wall.

Referring to FIG. 5 a type of insulation for the interstitial walls may be a chamber or a passageway 132 may be formed or embedded within the interstitial wall 130 for containing or passing a fluid or a gas or creating a gas envelope to reduce thermal conductivity from and further isolate one interior chamber 112 and an adjacent chamber 112. Alternatively, a series of bore holes 132 (FIG. 4) formed in the interstitial wall 130 may pass a selected thermal conductive or thermal non-conductive fluid or gas to further heat, cool or regulate the temperature of the interior wall 130 and the surrounding environment.

Yet another alternative of insulation would be to form the interstitial wall 130 from a different material having a desired thermal conductivity characteristic. As an example lines 134 in FIG. 5 depicts a boundary with wall portion 136 being formed from the different thermally insulating material than the remainder of the chamber walls 118.

Figure 6:
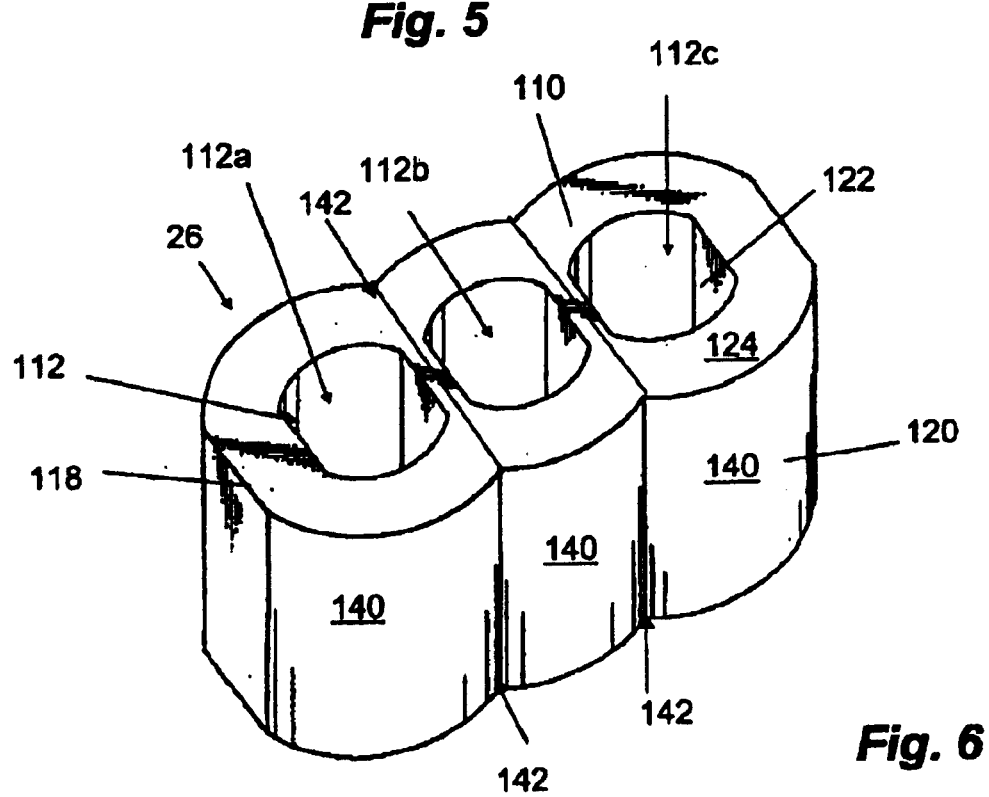
FIG. 6 is another isomeric view of an oven chamber module formed from at least two separate enclosure bodies.

With reference to FIG. 6 optionally the furiace enclosure member 110 could be formed from at least two separate enclosure bodies 140. Each separate enclosure body 140 has at least one interior chamber 112, although there could be enclosure bodies with either no interior chambers or with more than one interior chamber. The separate enclosure bodies 140 preferably have an outer surface 142 formed to be compatible with an outer surface or face 142 of an adjacent separate enclosure body 140.

Such insulating methods and other insulating techniques would further isolate one chamber 122 from another and tend to create a thermal barrier comprising the separator walls 130.

In summary, a COGS "module" consists of several ceramic oxygen generating elements or Integrated Manifold and Tube modules (IMATs) inside an oven insert or enclosure (including insulation, heating elements, heat exchanger, an air inlet, and a product gas outlet). Each module produces a specific amount oxygen at a given level of power consumption. Oxygen generating systems are composed of a number of modules that depends on the peak oxygen flow requirement, system size requirement, and power consumption requirement.

The present invention of modularizing the oven enclosure along with the oxygen generating elements has several advantages:

a. Temperature uniformity and control: As enclosures containing, ceramic oxygen generating, elements become larger and contain more modules, temperature gradients within the enclosure become larger and more difficult to control. Having several smaller enclosures allows more precise control and more uniform temperatures.

b. Fault tolerance: In the case of a malfunction involving an oven component, the module containing the malfunction can be shut down while other modules continue to operate. The remaining modules can either be operated in standard mode or in a higher output mode, to compensate for the shut down of one module.

c. Improved efficiency at lower flows: Thermal conduction through the walls of the insulated enclosure is a significant source of power consumption. In the case where a fraction of the peak flow is required, one or more of the oven modules can be shut down to reduce overall system heat loss versus a single enclosure device.

The increased system efficiency and improved thermal stability possible using the present modular design does come at a certain "cost." Some of the potential disadvantages to such a furnace design are:

1. Significantly increased control complexity.
2. Increased system size and weight.
3. Significantly increased system response times when modular furnaces are placed in "stand-by" mode or turned off.

The foregoing disclosure and description of the invention are illustrative and explanatory thereof, and various changes in the size, shape and materials, as well as in the details of the illustrated construction may be made without departing from the spirit of the invention.

What is claimed is:

1. An oven insert assembly including a gas generation system having heating elements, heat exchanger, a gas generating module, an air inlet and a product gas outlet, the oven insert assembly further comprising:

a furnace enclosure member having a plurality of interior chambers each adapted for holding at least one gas generating module.

2. The invention of claim 1 wherein the interior chambers each have an opening formed in the exterior of the furnace enclosure member; and the openings are uniformly separated along a central axis of a face of the furnace enclosure member.

3. The invention of claim 1 wherein the furnace enclosure member includes embedded heater elements providing uniform heat distributed about the interior chambers.

4. The invention of claim 1 wherein an interstitial wall is formed between adjacent interior chambers.

5. The invention of claim 4 wherein the interstitial wall is composed of a material having a desired thermal conductivity characteristic different from material comprising the remainder of the furnace enclosure member.

6. The invention of claim 4 wherein the interstitial wall includes a chamber for a fluid.

7. The invention of claim 1 wherein the furnace enclosure member further comprises at least two separate enclosure bodies, each separate enclosure body having at least one interior chamber.

8. The invention of claim 7 wherein the separate enclosure bodies having an outer surface formed to be compatible with an outer surface of an adjacent separate enclosure body.

* * * * *